United States Patent
Dewan et al.

(10) Patent No.: US 9,342,704 B2
(45) Date of Patent: May 17, 2016

(54) ALLOCATING MEMORY ACCESS CONTROL POLICIES

(75) Inventors: Prashant Dewan, Hillsboro, OR (US); Jason Martin, Beaverton, OR (US); Uday R. Savagaonkar, Portland, OR (US); Carlos V. Rozas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 245 days.

(21) Appl. No.: 13/993,421

(22) PCT Filed: Dec. 28, 2011

(86) PCT No.: PCT/US2011/067450
§ 371 (c)(1),
(2), (4) Date: Jun. 12, 2013

(87) PCT Pub. No.: WO2013/100921
PCT Pub. Date: Jul. 4, 2013

(65) Prior Publication Data
US 2014/0123235 A1  May 1, 2014

(51) Int. Cl.
*G06F 21/00* (2013.01)
*G06F 21/62* (2013.01)
*G06F 21/53* (2013.01)
*G06F 7/04* (2006.01)
*G06F 15/16* (2006.01)
*G06F 17/30* (2006.01)
*G06F 12/00* (2006.01)

(52) U.S. Cl.
CPC .............. *G06F 21/62* (2013.01); *G06F 21/53* (2013.01)

(58) Field of Classification Search
None
See application file for complete search history.

(56) References Cited

U.S. PATENT DOCUMENTS

| | | | |
|---|---|---|---|
| 6,795,855 B2 * | 9/2004 | Bonilla et al. | 709/223 |
| 6,976,270 B2 | 12/2005 | Sanchez | |
| 7,093,125 B2 | 8/2006 | Robb | |
| 7,506,096 B1 * | 3/2009 | Koryakin | G06F 12/109 711/202 |
| 8,412,754 B2 * | 4/2013 | Chen et al. | 707/831 |
| 2003/0200450 A1 * | 10/2003 | England | G06F 21/6218 713/189 |
| 2004/0221126 A1 * | 11/2004 | Peinado et al. | 711/203 |
| 2005/0144422 A1 * | 6/2005 | McAlpine | G06F 12/1081 711/206 |
| 2008/0005447 A1 * | 1/2008 | Schoenberg | G06F 12/109 711/6 |
| 2009/0172330 A1 * | 7/2009 | Dewan | G06F 12/1491 711/163 |
| 2010/0250877 A1 * | 9/2010 | Gaither | G06F 9/4856 711/162 |
| 2011/0072428 A1 * | 3/2011 | Day et al. | 718/1 |
| 2011/0296411 A1 * | 12/2011 | Tang et al. | 718/1 |
| 2012/0255015 A1 * | 10/2012 | Sahita et al. | 726/24 |
| 2014/0229943 A1 * | 8/2014 | Tian et al. | 718/1 |

OTHER PUBLICATIONS

PCT International Search Report and Written Opinion issued in corresponding PCT/US2011/067450 dated Sep. 20, 2012 (9 pages).

\* cited by examiner

*Primary Examiner* — Shin-Hon Chen
(74) *Attorney, Agent, or Firm* — Trop Pruner & Hu, P.C.

(57) ABSTRACT

Enabling access control caches for co-processors to be charged using a VMX-nonroot instruction. As a result a transition to VMX-root is not needed, saving the cycles involved in such a transition.

30 Claims, 2 Drawing Sheets

ALLOCATING MEMORY ACCESS CONTROL POLICIES

BACKGROUND

This relates generally to computer processing using virtualization.

Computer systems are subject to attack by malware. Unauthorized software may infect a computer system and cause the computer to operate in improper ways. Generally software running on a central processing unit is controlled by various techniques such as rings and range registers. However, other co-processors on the same system may operate independently of these protections and thus may provide an avenue for system attack.

One known solution is to use virtualization technology including the VT-d virtualization technology available from Intel Corporation. The VMX-root mode operation is primarily intended for use by a virtual machine monitor (VMM) and its operation is like that without virtualization. The VMX-nonroot mode is controlled by a virtual machine monitor (VMM) and is designed to support virtualization.

Sometimes co-processors need regulated access to system memory at the granularity of the software executing on the co-processor. The software modules that execute on the graphics processor are called shader kernels and the system memory access is needed at the granularity of the shader kernel.

BRIEF DESCRIPTION OF THE DRAWINGS

Some embodiments are described with respect to the following figures.

DETAILED DESCRIPTION

Since the access control is enforced by the VMM running in the VMX-root mode, the management of access control needs a transition between the virtual machine (VM) running in the VMX-nonroot mode and the VMM running in the VMX-root mode. Since these transitions are expensive, there is a need to accelerate these transitions to the frequency of the context switching on the co-processor software. Thus there is a need to enable computer systems to operate in the nonroot mode with all the protections associated with virtualization technology and with high memory access speeds without the need to switch to VMX-root mode.

In some embodiments this can be done by setting up a permissions-map per context that can be switched without switching to VMX-root mode when rapid context switches are needed. The permissions-map provides suitable access restrictions to protect the system from malicious accesses by co-processor devices on the system. The VMM establishes a memory map that provides the restrictions for a given processing device to enable rapid access of memory from the VMX-nonroot mode.

Figure 1:
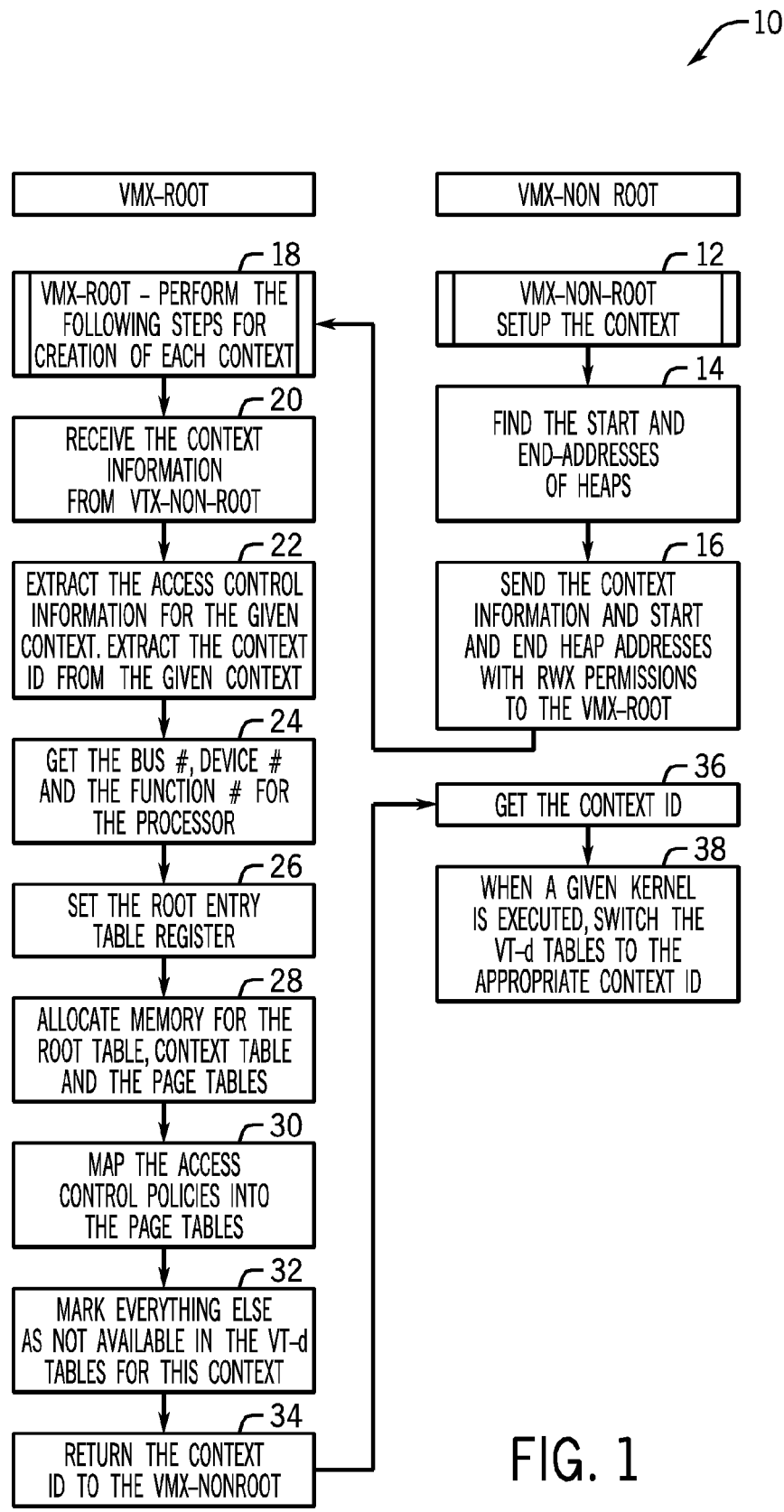
FIG. 1 is a flow chart for one embodiment.

Referring to FIG. 1, a sequence 10 for changing an access control permission-map without having to explicitly transition to the VMX-root mode may be implemented in software, firmware and/or hardware. In software and firmware embodiments, it may be implemented by computer executed instructions stored in a non-transitory computer readable medium such as a magnetic, optical or semiconductor storage.

The sequence basically has two parts. The VMX-root mode is on the left in FIG. 1, and the VMX-nonroot on the right in FIG. 1. Thus, the left column is entirely in the VMX root mode and only the right column is in the VMX-nonroot mode.

The sequence begins in block 12 wherein the VMX-nonroot mode sets up the context. The context is a set of data structures that an operating system or a device driver needs to establish before it assigns a role to a processing device. Examples of such processing devices include a graphics processing unit, a network interface controller, coprocessor, or any other processing processor based device.

In one example, when the processing device is a network interface card, the context is all the information that the operating system or device driver needs to send out to the network interface card such as Internet Protocol address, network interface card speed and the like.

Moving next to block 14, the start and end addresses of the pertinent heaps that need to be accessible by a particular processing device are obtained. Thus, in the case of a graphics processing unit, the needed heaps may be the surface heap, the instruction heap and the general heap. Different heaps may need to be accessed by different processing devices and thus the needed heaps are identified and their start and end addresses acquired.

Next as indicated in block 16, the context information and the start and end heap addresses are sent together with the read write (RWX) permissions to the VMX-root mode. Thus the flow moves to the first column under the heading VMX-root.

In block 18, the first block in VMX-root mode, the following steps are performed for the creation of each context. A different context is needed for each device that will be implicated and in some cases a single device may need more than one context. For example, a graphics processing unit generally has several contexts. Each context is associated with different software that can execute on the processing device.

In block 20, the context information that was collected in the nonroot mode is acquired. Then in block 22 the access control information for the given context is extracted. Also extracted is the context identifier for the given context.

In block 24, the bus number, device number, and function number for the processing device are obtained. Generally these numbers may be assigned pursuant to a bus protocol such as a Peripheral Component Interconnect bus protocol.

Referring next to block 26, a root entry table register is set up. In Intel® processors, a virtualization called VT-d sets up access provisions based on the bus device number, function number and bus number. Other virtualization protocols can be used in other embodiments.

In each virtualization, a memory map for the device is established. Access to a memory for a given processing device may be provided by changing the memory map. The memory map may be changed by setting up a root entry table to achieve the needed context for that processing device.

This changing of the memory map avoids the need to transition between VMX-root and nonroot modes thereafter during processing device operation in any established context. Such switching is extremely expensive in terms of latency and cycles.

Thus, in one embodiment, a switch_context instruction may be used to change the memory map. The VMX-nonroot requests the VMX-root to set up the access tables. Then, when the VMX-nonroot wants to switch access tables, it can use the same instruction to flip without a switch from nonroot to root modes. This eliminates a number of steps that are not needed for a switch from nonroot mode and these steps tend to be very computationally expensive. Therefore you do not have to switch back to the root mode for that particular device and the functions that have been set up as described above.

Referring to block 28, memory is allocated for a root table, context table and the page tables. Then in block 30, the access control policies are mapped into the page tables. Everything else is marked (block 32) as not available in the VT-d or other virtualization tables for this context. Therefore the device can only access memory that has been set up and not anything else. Thus security may be maintained.

Then in block 34, the context identifiers return to the VMX-root and the flow goes back to the VMX-nonroot mode.

In the VMX-nonroot mode, the context identifier may be obtained as indicated in block 36. When a given kernel is executed, the VT-d or virtualization tables are switched to the appropriate context identifier without requiring a switch back to the VMX-root mode (block 38). Thus the code running in the VMX-root sets up a hierarchy of access tables for a unique root pointer for every set of permissions. The code running in the VMX-nonroot mode then assigns these permissions to the appropriate context using the switch_context instruction. The switch_context instruction only switches root pointers and flushes any permission caches without explicitly causing a switch from the VMX-nonroot to the VMX-root mode, thereby saving many cycles.

In some systems, kernel scheduling is offloaded to a microcontroller such as a microcontroller in a graphics processing unit itself. In those systems, the microcontroller needs to be able to switch the VT-d pointers. In such systems, the VT-d tables are set up by the host operating system or the virtual machine monitor but the root pointers are switched by the device controller instead of the central processing unit.

Figure 2:
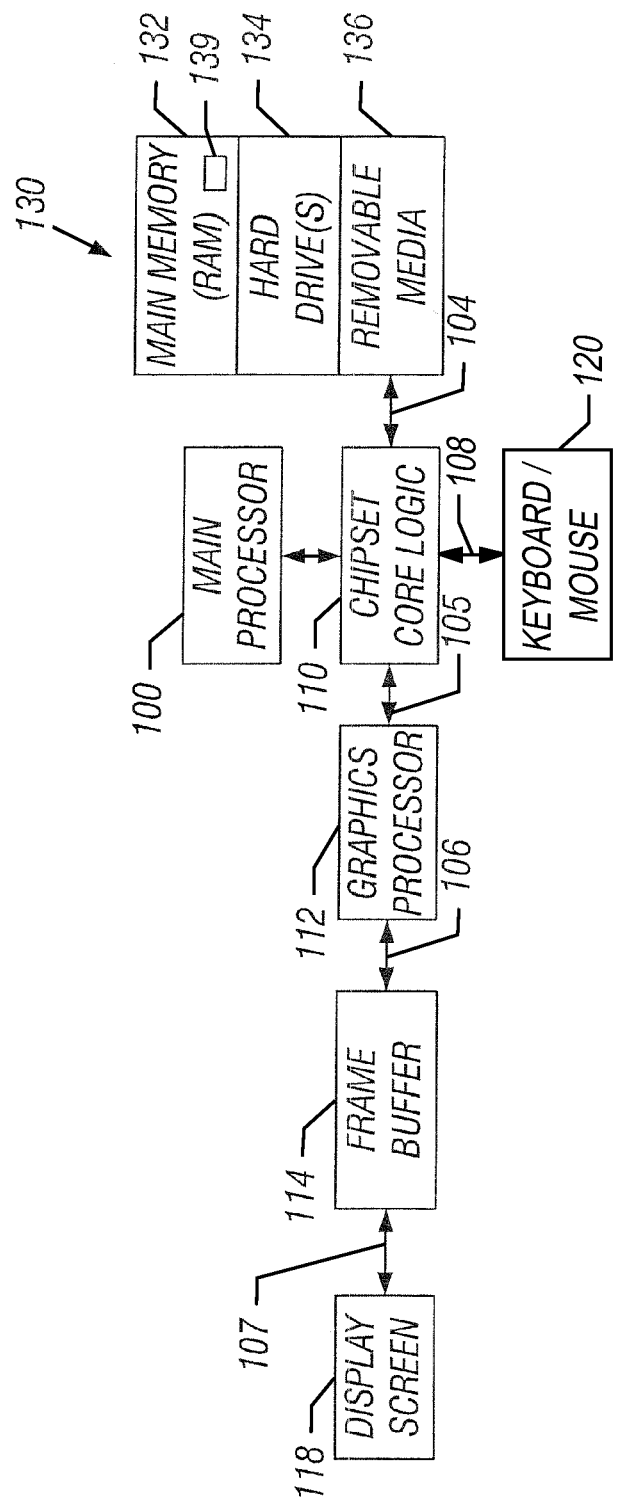
FIG. 2 is a system depiction for one embodiment.

The computer system 130, shown in FIG. 2, may include a hard drive 134 and a removable medium 136, coupled by a bus 104 to a chipset core logic 110. The computer system may be any computer system, including a smart mobile device, such as a smart phone, tablet, or a mobile Internet device. A keyboard and mouse 120, or other conventional components, may be coupled to the chipset core logic via bus 108. The core logic may couple to the graphics processor 112, via a bus 105, and the central processor 100 in one embodiment. The graphics processor 112 may also be coupled by a bus 106 to a frame buffer 114. The frame buffer 114 may be coupled by a bus 107 to a display screen 118. In one embodiment, a graphics processor 112 may be a multi-threaded, multi-core parallel processor using single instruction multiple data (SIMD) architecture.

In the case of a software implementation, the pertinent code may be stored in any suitable semiconductor, magnetic, or optical memory, including the main memory 132 (as indicated at 139) or any available memory within the graphics processor. Thus, in one embodiment, the code to perform the sequences of FIG. 1 may be stored in a non-transitory machine or computer readable medium, such as the memory 132, and/or the graphics processor 112, and/or the central processor 100 and may be executed by the processor 100 and/or the graphics processor 112 in one embodiment.

FIG. 1 is a flow chart. In some embodiments, the sequences depicted in these flow charts may be implemented in hardware, software, or firmware. In a software embodiment, a non-transitory computer readable medium, such as a semiconductor memory, a magnetic memory, or an optical memory may be used to store instructions and may be executed by a processor to implement the sequences shown in FIG. 1.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   enabling access control context to be changed, by a hardware computer processor, using an instruction in virtualization mode that is not fully privileged and without transitioning to a fully privileged mode only accessible by a virtual machine monitor, by changing a memory map for a device while limiting access to other portions of the memory.

2. The method of claim 1 including setting up access tables with a unique root pointer for a set of permissions.

3. The method of claim 2 including assigning the set of permissions to a context.

4. The method of claim 3 including switching root pointers.

5. The method of claim 3 including flushing permission caches.

6. The method of claim 1 including offloading kernel scheduling to a graphics processor.

7. The method of claim 6 including enabling the graphics processor to switch root pointers.

8. The method of claim 1 including setting up a context for a co-processor in the mode that is not fully privileged.

9. The method of claim 8 including sending the context to the fully privileged mode.

10. The method of claim 9 including extracting access control information for the context in the fully privileged mode.

11. A non-transitory computer readable medium storing instructions to enable a hardware computer processor to perform:
    enabling access control context to be changed using an instruction in virtualization mode that is not fully privileged and without transitioning to a fully privileged mode only accessible by a virtual machine monitor, by changing a memory map for a device while limiting access to other portions of the memory.

12. The medium of claim 11 further storing instructions to perform a method including setting up access tables with a unique root pointer for a set of permissions.

13. The medium of claim 12 further storing instructions to perform a method including assigning the set of permissions to a context.

14. The medium of claim 13 further storing instructions to perform a method including switching root pointers.

15. The medium of claim 13 further storing instructions to perform a method including flushing permission caches.

16. The medium of claim 11 further storing instructions to perform a method including offloading kernel scheduling to a graphics processor.

17. The medium of claim 16 further storing instructions to perform a method including enabling the graphics processor to switch root pointers.

18. The medium of claim 11 further storing instructions to perform a method including setting up a context for a co-processor in the mode that is not fully privileged.

19. The medium of claim 18 further storing instructions to perform a method including sending the context to the mode that is fully privileged.

20. The medium of claim 19 further storing instructions to perform a method including extracting access control information for the context in the mode that is fully privileged.

21. An apparatus comprising:
a hardware computer processor to enable access control context to be changed using an instruction in virtualization mode that is not fully privileged and without transitioning to a fully privileged mode only accessible by a virtual machine monitor, by changing a memory map for a device while limiting access to other portions of memory; and
a hardware computer co-processor coupled to said processor.

22. The apparatus of claim 21 said processor to set up access tables with a unique root pointer for a set of permissions.

23. The apparatus of claim 22 said processor to assign the set of permissions to a context.

24. The apparatus of claim 23 said processor to switch root pointers.

25. The apparatus of claim 23 said processor to flush permission caches.

26. The apparatus of claim 21 said processor to offload kernel scheduling to the co-processor that is a graphics processor.

27. The apparatus of claim 26 said processor to enable the co-processor to switch root pointers.

28. The apparatus of claim 21 said processor to set up a context for the co-processor in the mode that is not fully privileged.

29. The apparatus of claim 28 said processor to send the context to the fully privileged mode.

30. The apparatus of claim 29 said processor to extract access control information for the context in the fully privileged mode.

* * * * *